Dec. 5, 1944.

E. W. MILLER 2,364,542

GENERATIVE GRINDING MACHINE WITH
ROLLING WORK OR TOOL CARRIER

Filed April 8, 1942

Inventor
Edward W. Miller
by Wright, Brown, Quinby & May
Attys.

Dec. 5, 1944.  E. W. MILLER  2,364,542
GENERATIVE GRINDING MACHINE WITH
ROLLING WORK OR TOOL CARRIER
Filed April 8, 1942  9 Sheets-Sheet 9

Inventor
Edward W. Miller
by Wright, Brown, Quinby & May
Attys.

Patented Dec. 5, 1944

2,364,542

UNITED STATES PATENT OFFICE 2,364,542

GENERATIVE GRINDING MACHINE WITH ROLLING WORK OR TOOL CARRIER

Edward W. Miller, Springfield, Vt., assignor to The Fellows Gear Shaper Company, Springfield, Vt., a corporation of Vermont Application April 8, 1942, Serial No. 438,136

29 Claims. (Cl. 51—56)

The present invention relates to machine tools and particularly machines for finish generating the teeth of gears by the action of a grinding wheel, with a relative rolling movement between the work gear and grinding wheel transversely of the axis of the gear, and a relative traverse between the gear and grinding wheel generally lengthwise of such axis. However, it is not limited to the art of grinding machines as distinguished from machines using other types of cutting or smoothing tools (such as milling cutters, shaving cutters, lapping or burnishing tools, etc.). Neither is it limited to gears as the class of objects to be made or finished by the instrumentalities of the machine, but includes machines for operating on many other kinds of work piece, such as gear shaper cutters, cams and, in general, any piece to which a prescribed shape may be imparted by relative rolling traverse between the work piece and tool, or by progression of a formed tool. Hence, although I have herein illustrated the invention as applied to grinding machines designed to generate involute curves in gear teeth, gear cutter teeth, cams and the like, I wish to make it clearly understood that such showing is illustrative only and is not intended to have any limiting effect beyond that of the foregoing statement and the scope of the claims.

One of the principal objects of the invention is to effect rectilinear movement of a work carrier or tool carrier, or of both simultaneously, without the use of a sliding carriage or equivalent slide and by the employment of rolling members instead. A further object, closely related to the foregoing, is to effect by the same rolling action which imparts translative displacement, an angular movement of the part so displaced in such fashion as to generate an involute curve. Other objects are concerned with provisions for adjustment whereby to alter the characteristics of the involute curves generated by such combinations of rotation and translation, and other adjustments whereby tapered work pieces may be generated as well as those in which the surface elements are equidistant from the axis of angular motion throughout their length.

The drawings furnished herewith to illustrate the invention show four machines embodying the same principles, with variations in some particulars from each other; and illustrate additionally some of the various shapes of grinding wheel which may be used in these and other equivalent embodiments of the invention.

In the drawings.

Like reference characters designate the same parts wherever they occur in all the figures.

The machine shown in Figs. 1-6 inclusive has a supporting structure similar in design to that of the conventional planer. It comprises a base 10 on which a sliding table 11 is mounted to reciprocate, and uprights 13 and 14 at opposite sides of the base, rising above the table, and connected at their upper ends by a cross beam 15. The table 11 carries a grinding wheel 16, and the uprights 13 and 14 serve to position and guide a work supporting structure 17 on which a work spindle 18 is mounted to carry a work piece 19. The work holding structure 17 may be adjusted vertically to acommodate work pieces of different diameters or radii by means such as screws 20 similar to the means by which the cross rail of a planer is adjusted.

Figure 1:
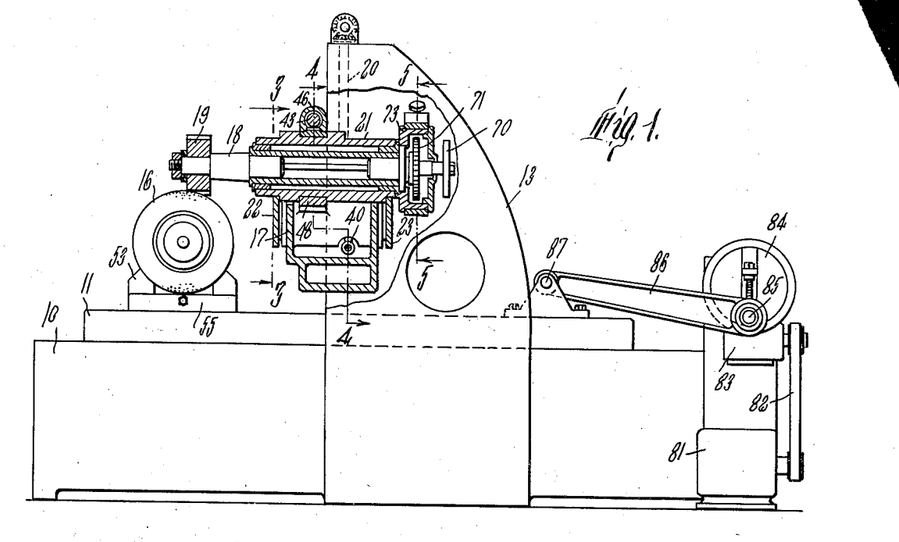
Fig. 1 is a side elevation, partly broken away and shown in section, of one design of grinding machine embodying the invention.
Figure 2:
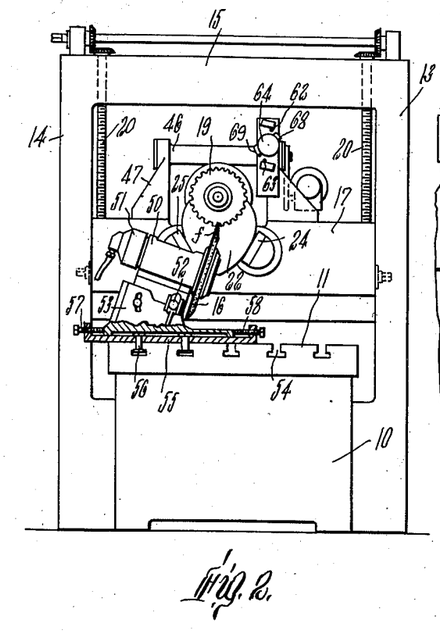
Fig. 2 is an end elevation of the machine as seen from the left of Fig. 1.

This machine is adapted to grind to finished form and dimensions the involute tooth faces of wide faced gears and similar machine elements. In performing this operation the work piece is rolled across the edge of the grinding wheel with the face of a tooth in contact with a face of the wheel; such rolling movement being compounded of linear translation of the gear in a direction transverse to its axis and rotation about its axis, at related speeds such that the shifting engagement of the tooth in process of being ground, with the face of the grinding wheel, generates an involute curve; and the table is at the same time reciprocated to distribute the cutting effect uniformly along the face of the gear.

Figure 3:
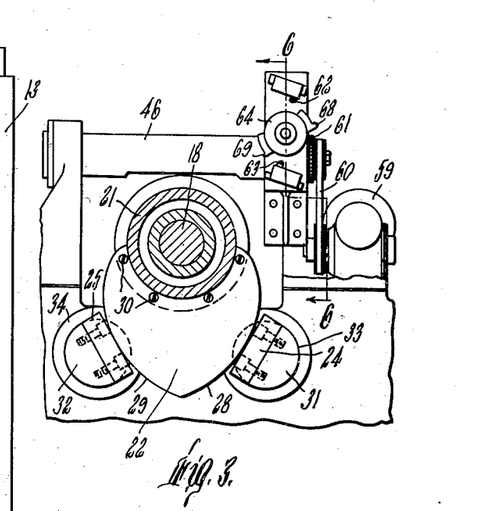
Figs. 3, 4 and 5 are cross sections, on a larger scale, taken on lines 3—3, 4—4 and 5—5, respectively, of Fig. 1.
Figure 4:
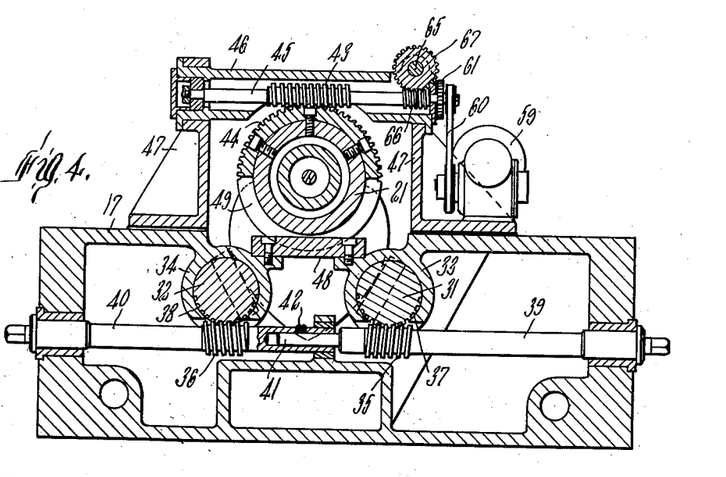

For so rolling the work gear, the following mechanism is provided. A tubular carrier 21, in which the work spindle is mounted rotatably for indexing, carries adjacent to its opposite ends formers 22 and 23, which extend downwardly between, and rest upon, abutments 24, 25, 26 and 27. These abutments are arranged in pairs, the pair designated 24 and 25 being in the same plane with, and engaging, the former 22, and the pair designated 26 and 27 being in the same plane with and engaging the former 23, as shown plainly by Figs. 3 and 5. The members of each pair are inclined oppositely to one another with an included angle large enough to provide a solid support for the carrier and prevent binding of the formers. For the generation of involute curves, the formers have involute opposite contact faces 28 and 29, and the abutments have plane contact faces, these elements being of the same essential character as conjugate gear and rack tooth faces. Both formers are symmetrical at opposite sides of the median line in this embodiment, and they are arranged with their median lines in the same radial plane of the spindle and spindle carrier. But perfect symmetry is not essential, since variations, within limits, can be compensated by angular adjustment of the abutments at one side of the formers relative to those at the other side. They are detachably secured to the carrier by screws 30, as shown by Fig. 3, to permit removal and substitution of other formers having different face curves. For simplicity and convenience of manufacture, the two formers are duplicates of each other, and the contact faces of the corresponding abutments of both pairs are in respectively the same planes. These last mentioned particulars, however, may be varied, within limits, without departing from the invention.

Figure 5:
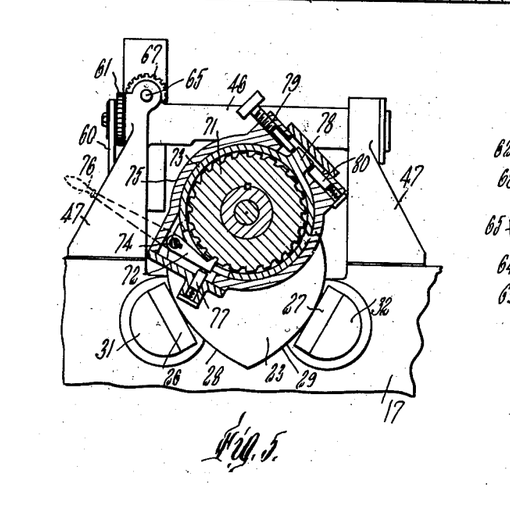

The abutments 24 and 26 are secured to the ends of a cylindrical bar 31, and the abutments 25 and 27 are correspondingly secured to the ends of a cylindrical bar 32. These bars are rotatably mounted in bearings 33 and 34, respectively, in the supporting structure 17, the axes of which are parallel to the axis of the work spindle holder. Their axes are also in the same horizontal plane and are equidistant from the middle position of the spindle holder axis. Provision is made for adjusting the inclinations of the abutment faces for a purpose later explained, such provisions, in the present illustration, consisting of worms 35 and 36 meshing with worm gear teeth 37 and 38 cut in the sides of the cylindrical bars 31 and 32, respectively. The threads of the two worms are of respectively opposite hands, and are of equal lead, in order that when both are turned equally in the same direction, the two abutment-carrying bars will be turned through equal angles in relatively opposite directions. The worms are carried by shafts 39 and 40, which protrude through the end walls of the supporting structure 17 and are accessible through suitably disposed openings in the uprights 13 and 14 to receive wrenches or cranks on their protruding ends, whereby they may be rotated. One of the shafts has an extension 41 on its inner end protruding into a socket in the contiguous end of the other shaft, in which it is locked against rotation by a set screw 42 threaded through the wall of the socket. When the screw is set up, rotation of either shaft turns the other equally. But the screw may be loosened to permit an adjustment of either shaft, whereby to bring the abutments carried by the respective bars into the correct angular relation.

Rotation is imparted to the spindle carrier 21 by a worm 43 meshing with a worm gear segment 44 secured to the spindle carrier. This worm is carried by a shaft 45 rotatably mounted in a housing 46 which is supported by brackets 47 on the structure 17. Rotation of the spindle carrier causes the formers 22 and 23 to rock on their respective abutments, with displacement of the spindle carrier transversely of its axis. The carrier is prevented from shifting endwise, while being so displaced, by a guide bar 48 fixed to the supporting structure beneath the spindle carrier with an intermediate portion of its length extending tangentially through a groove 49 provided in the under side of the carrier. The opposite side faces of the guide bar 48 and groove 49 are located in planes perpendicular to the spindle carrier axis and are the cooperating elements which prevent endwise displacement of the carrier.

Displacements of the spindle carrier axis, due to the coaction of the formers and abutments, when the carrier is rotated, takes place in a plane which, in this instance, is horizontal. This fact is graphically explained by the diagram in Fig. 20, which represents a former F, of the same character as the formers previously described, in three positions of rotative cooperation with abutments A and A'. It is shown by solid lines in mid position. bc is the base circle from which the involute side faces of the former are generated, and $d$ is the center of this base circle in mid position. The lines of action of the former with the abutments are then at $la$ and $l'a'$, respectively. The crossing point $p$ of these lines of action is the pitch point of the former with respect to the abutments. Rocking of the former causes a pitch circle $pc$, of which the center is at $d$ and the circumference passes through the pitch point $p$, to roll without slip on a straight pitch line $pl$ perpendicular to the radial line $dp$. Rocking of the former in clockwise rotation to the position shown by the dash lines, shifts the center $d$ to the position $d'$; and rocking counterclockwise to the position shown by dotted lines shifts center $d$ to $d^2$. These three positions, and all other positions of the center throughout the full range of possible rocking movement, are all in the same straight line. Hence the displacement of the work spindle, which is carried by the formers of the preceding description in the same relation thereto as the relation of center $d$ to the former F of the diagram, takes place in a plane, exactly as though it were mounted on a slide or carriage supported by elongated guideways or tracks.

Figure 20:
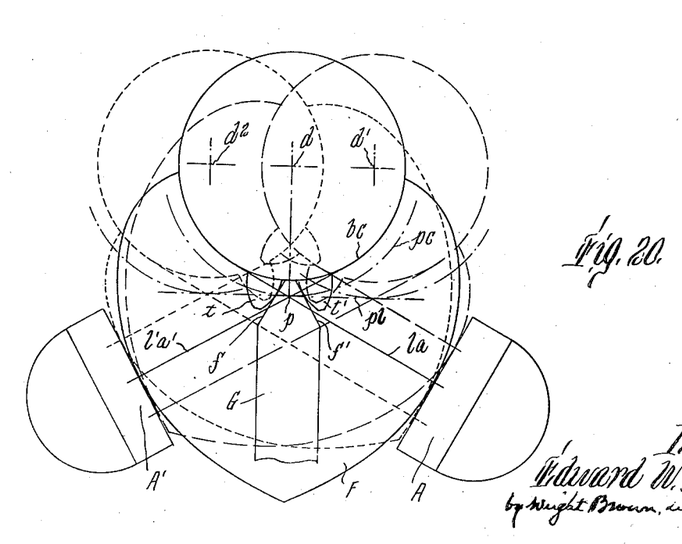
Fig. 20 is a diagram showing the manner in which desired movements of translation, and compound movements of translation and rotation, of a spindle or other work or tool holder are accomplished by the novel means of the present invention.

This means for effecting rectilinear displacement of the work spindle is of much practical advantage over a slide or carriage for the same purpose. It avoids entirely the task of finishing long, straight, uninterrupted surfaces, such as guideways or tracks, and the mating surfaces of a slide or carriage. This alone is an important achievement, for the finishing of such surfaces with the necessary accuracy is laborious and time consuming. It also largely eliminates the sliding friction of such a carriage and guideways, for the coaction of the formers with the abutments is largely that of rolling.

When a grinding wheel, as represented at G, is mounted to rotate with its margin intersecting the pitch line $pl$ and a face $f$ parallel with the face of abutment A, (or two faces $f$ and $f'$ parallel to the abutments A and A' respectively), and a gear is suitably mounted concentric with the center $d$ and with teeth $t$ and $t'$ disposed to roll across the grinding faces $f$ and $f'$ as the abutment is rocked, the grinding wheel generates curves on the sides of the teeth which are involutes of the base circle $bc$. Curves of other base circles are similarly generated with settings of the abutment faces and wheel faces at various inclinations to one another.

The principle thus explained is employed in the machine now being described. The grinding wheel 16 has an active face $f$ in a plane perpendicular to its axis, which may be set at various inclinations to the rolling plane of the work piece. Its upper rim is disposed to enter between two teeth of the work gear 19 across the pitch line on which the gear is caused to roll by the rocking movement of the spindle holder and formers. The wheel is secured to a spindle which rotates in a housing 50, and the end of which opposite to that carrying the wheel is coupled to the rotative element of a motor 51. This motor is here shown conventionally and may be a hydraulic or electric motor of any suitable character, types of which are well known. Housing 50 is coupled by pivots 52 with a base 53, whereby the inclination of the wheel face may be varied to generate curves of different pressure angles and base circles. The base 53 rests on a sub-base 55 which is clamped to the bed by bolts 56 contained in the usual T slots 54 of the bed. The base 53, carrying the wheel, if shiftable transversely of the bed to bring the grinding wheel into the required position, and the sub base 55 is provided with adjusting screws 57 and 58, bearing against opposite ends of base 53, whereby the position of the latter may be exactly regulated. The sub-base itself may be located in different positions across the width of the bed by placing the bolts 56 in different ones of the slots 54. Thus both rough and fine adjustments for the wheel are provided for in correlation with the angular adjustment previously described.

Figure 18:
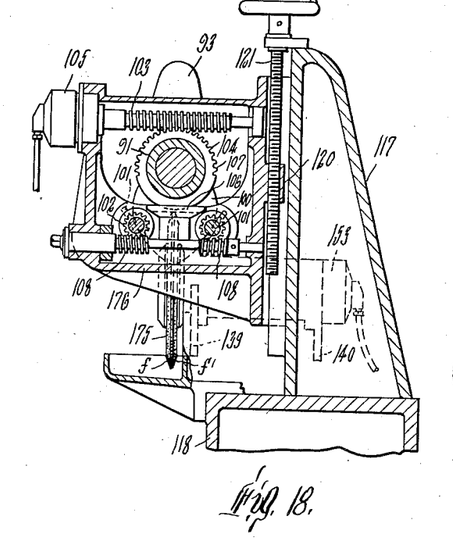
Fig. 18 is a view similar to Fig. 15 of another form of machine embodying many of the features of the machine shown in Figs. 7–17 inclusive, equipped with a grinding wheel of rack tooth profile at its circumference, which is capable of substitution for the grinding wheels of either of the preceding designs of machine.

In place of the plane faced wheel 16 here shown, a wheel of cone profile, like that shown in Fig. 18, which is of the same type as the wheel G in the diagram, may be mounted on the table 11 with its axis horizontal and the plane of rotation vertical. Any suitable mounting for such a vertical wheel may be provided, according to the preference of the designer, and it is within my contemplation to make the wheel spindle holder 50 adjustable through a sufficient angle to bring the spindle axis horizontal so that it may carry a wheel of rack tooth profile.

By the substitution of different formers, the face curves of which are generated from different base circles, different curves may be generated in the work piece while the abutments remain at an invariable center distance from each other and from the central position of the axis of the work. Further, by angular adjustment of the abutments about their axes and by angular adjustment of the active face of the grinding wheel, a considerable range of curves of different base circles may be generated with the use of the same formers. These facts are graphically demonstrated by the diagrams shown in Figs. 21 and 22.

Figure 21:
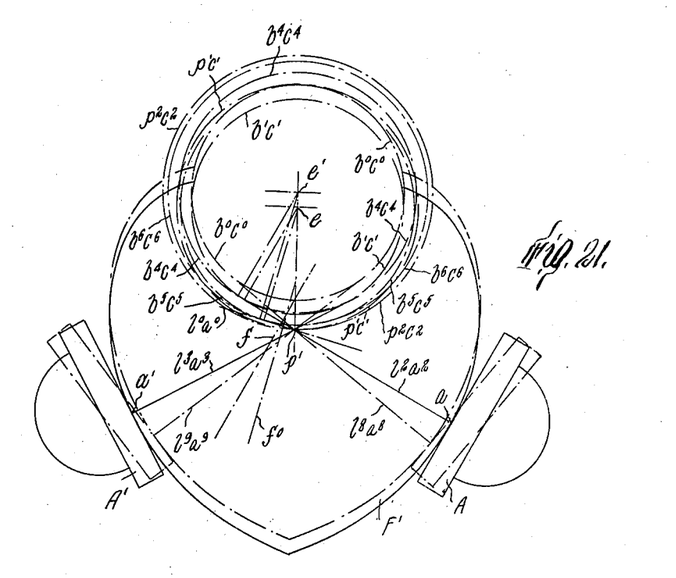
Figs. 21 and 22 are further diagrams explanatory of the fact that, by substitution of different formers and adjustment of abutments at an invariable center distance apart, a wide variety of curves may be generated by machines constructed in accordance with this invention.
Figure 22:
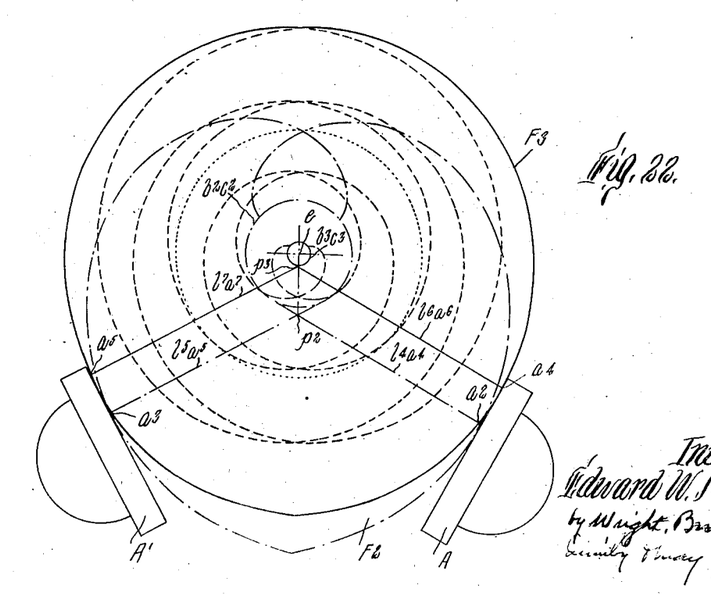

The bearings 33 and 34 for the bars which support the abutments are fixed, wherefore their axes are at a fixed distance from each other and at fixed distances from any given position of the axis of the spindle carrier 21, as, for instance, the midposition of the latter axis. This is the case also with the work carriers and tool carriers of the other forms of the invention described in this specification. In Figs. 21 and 22 the abutments are designated by the generic characters A and A', as in Fig. 20, for simplicity, although their positions are somewhat different from those of the abutments shown in the latter figure. F', in Fig. 21, and $F^2$ and $F^3$, in Fig. 22, represent formers having involute contact faces generated from base circles of different diameters. These contact faces are suitably located with respect to their several base circles so that, when the formers are symmetrically placed in tangent contact with the abutments, and in substitution for one another, while the abutments remain unchanged as to their inclinations, the centers of the several base circles will all be at the same distance from the axes of the abutments. Considering now only the full line showing of the former F' and abutments in Fig. 21, the base circle of the former F' is $b'c'$ and its center is at $e$. In symmetrical midposition, its points of tangent contact with the respective abutments are at $a$ and $a'$, its lines of action are $l^2a^2$ and $l^3a^3$, and its pitch point is at $p'$. The former $F^2$ has contact faces which are involute curves of a base circle $b^2c^2$, smaller in diameter than the base circle $b'c'$, and having the same center $e$. It makes tangent contact with the abutments at $a^2$ and $a^3$, its lines of action are $l^4a^4$ and $l^5a^5$, and its pitch point is $p^2$. To distinguish the formers $F^2$ and $F^3$, which are drawn superposed in the same figure, for purposes of comparison as well as to save space, the curves of former $F^2$ are drawn in dot and dash lines, while the periphery of former $F^3$ is drawn in full lines.

The contact faces of former $F^3$ are outer convolutions of involutes generated from a still smaller base circle $b^3c^3$ centered at $e$. The inner convolutions of these curves are shown by dotted lines. Their tangent points with the abutment are at $a^4$ and $a^5$, their lines of action at $l^6a^6$ and $l^7a^7$, and the pitch point is at $p^3$.

Since the former is required to make contact with only two abutments, the starting points of its involute curves may be located at any points on the circumference of the base circle, and the tangent points with the abutments may be at any distance from the starting points of the curves, which will suffice to bring the centers of all the different base circles at the same distances from the abutment axes. As is made apparent by Fig. 22, the tangent points may be on any convolution of the involute curves, and it is immaterial whether or not the opposite curves cross between their points of origin and tangent points or not, and how many times they may cross each other.

The different tangent points $a, a^2, a^4$ and $a', a^3, a^5$ are located at different points along the faces of the abutments, and are in the middle portions of the areas over which the different formers roll. With the particular formers here shown, the work spindle carrier rolls on different pitch cylinders, of which the radii are respectively $e—p'$, $e—p^2$ and $e—p^3$. Equal angles of rotation therefore produce, with these different formers, widely differing linear displacements of the axis of the carrier, whereby different curves may be generated in the work.

Angular adjustments of the abutments and changes in the inclination of the contact face or element of the grinding wheel enable curves to be generated from different base circles with employment of the same former. Thus, if the abutments are turned through equal angles from the full line position to the broken line position shown in Fig. 21, while the former remains in midposition, the lines of action (being perpendicular to the abutment faces) are shifted through equal angles. Incidentally such shifting of the abutments causes or necessitates rise of the former and of the axis $e$ because the abutments are turned about fixed axes, and the axis $e$ is shifted to $e'$ and the base circle $b'c'$ to $b^0c^0$. The new lines of action, being tangent to the base circle in its changed location, are located at $l^8a^8$ and $l^9a^9$, and the pitch radius $e—p'$ and pitch circle $p'c'$, on which the carrier and former assemblage rolls with respect to the abutments, change to $e'—p'$ and $p^2c^2$ respectively. (The fact that in this illustration the location of the point $p'$ is the same with both positions of the abutments has no significance, since abutment adjustments through other angles cause the crossing point of the lines of action also to be shifted.)

Assuming that the active face or element of the grinding wheel remains in a plane $f$ parallel to the full line position of the abutment A when the abutment is turned to the broken line position, and is otherwise appropriately located to act on a work piece secured to the rolling assemblage, the line of action of the work piece with respect to the grinding wheel is $l^2a^2$, and the curve generated in the work piece is the involute of a base circle $b^4c^4$ centered at $e'$ and tangent to the line of action $l^2a^2$. This result is obtained whether the wheel face is actually in the plane designated by the line $f$, or at either side of it, provided only such face is parallel to the abutment face and disposed to act on that part of the work on which a curved surface is to be cut.

If the grinding wheel is tilted so that its active portion lies in a plane $f^0$, or a plane parallel thereto, when the abutments are in the full line position here illustrated, the line of action of the work relatively to the wheel is $l^0a^0$, (perpendicular to the plane $f^0$ and passing through the pitch piont $p'$), and the curve generated in the work is the involute of a base circle $b^5c^5$ centered at $e$ and tangent to $l^0a^0$.

When the abutments and wheel are both adjusted through the angles indicated, the base circle of the work becomes $b^6c^6$, centered at $e'$ and tangent to $l^0a^0$. Such adjustments, performed independently or in conjunction in various degrees, enable curves to be generated from base circles of all diameters within the practical limits of adjustment. Substitutions of different formers take care of conditions beyond these limits of adjustment.

Figure 6:
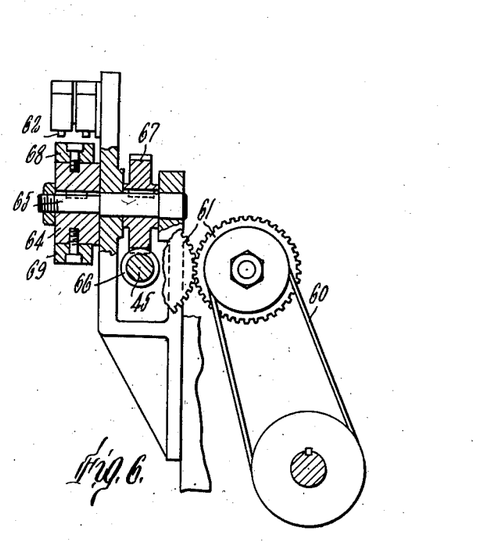
Fig. 6 is a detail sectional view taken on line 6—6 of Fig. 3.

Completing the description of mechanical details of the machine of Fig. 1, the worm shaft 45 is rotated in alternately opposite directions by a reversing electric motor 59 through a belt and pulley drive 60 and a gear pair 61, the driven member of which is secured to the shaft. The motor is reversed by switches 62 and 63 and a contactor drum 64 on a shaft 65, which is driven from shaft 45 by a worm 66 on the latter and a meshing gear wheel 67 on shaft 65, as shown by Fig. 6. Projections 68 and 69 on drum 64 are arranged to actuate the switches alternately after the shaft 45 has been rotated far enough to roll the spindle carrier 21 through the full swing in each direction needed for completion of a gear tooth. The swing in one direction is enough to bring the work gear entirely clear of the grinding wheel to permit indexing.

A manual indexing means is here provided consisting of a hand wheel 70 connected to the work spindle, with which cooperates an index disk or plate 71 keyed to the spindle and a locking pawl 72 which enters severally the notches in the circumference of the disk after rotation of the latter. The index disk is enclosed by a housing 73 secured to the end of the spindle carrier 21, and the locking pawl is secured to a stud shaft 74 journaled in an offset portion of a strap 75 which surrounds the housing 73. An external hand lever 76 is secured to shaft 74 and is movable to retract pawl 72 from its normal interlocked relation with the index plate, against the resistance of a spring pressed pin 77. The spindle may then be turned in the spindle carrier by means of the hand wheel 70.

A lug 78 on the housing 73 projects between an adjustable stop pin 79 and a spring pressed abutment 80 mounted in the encircling structure 75. By means of the screw 79 the pawl 72 may be shifted to impart a feeding increment of rotation to the work spindle through the index disk.

Automatic indexing means may be used in place of the manual mechanism just described; and later on in this specification automatic hydraulic indexing means are described which may be applied here without significant change.

The table 11 is reciprocated to carry the grinding wheel from end to end of the work gear, by means of an electric motor 81 acting through a belt drive 82 and gearing contained in a gear box 83 to rotate a crank disk 84. The latter carries a radially adjustable crank pin 85 coupled to the reciprocating table by a connecting rod 86 and wrist pin 87. The mounting and adjusting means for the crank pin 85 are of well known character.

In effect the part 21, which has been called a work spindle carrier in the preceding description, is itself a work holder or work carrier, to which the spindle 18 is an adjunct constituting means or provisions by which the work piece is connected to the holder 21 to be rolled by and with the latter across the rim of the grinding wheel. The spindle is here made rotatable independently of the carrier 21 for the purpose of indexing the work. But so far as the function of imparting rolling movement to the work is concerned, the spindle could as well be rigid with the holder, or the work piece secured to the holder by any one of a variety of other means, and indexed otherwise.

It may be noted here also that the grinding wheel shown here is generically a cutting tool, and typifies in the generic sense all cutting or other tools capable of being used in this or a similar combination for performing a desired cutting or finishing action on gears and other work pieces. The same thing is true as to the other grinding wheels described further on in this specification. Cutting or finishing tools of other types may be substituted for any of such grinding wheels within the scope of the protection here claimed, and are equivalent thereto. Also the gears herein shown and described as work pieces typify work pieces of all varieties, which may be operated on by cutting and finishing tools in any of the machines and equivalent combinations of mechanism herein described.

Another form of machine embodying the principles hereinbefore described, with additional features, is shown in Figs. 7–17 inclusive. Here the rolling work spindle carrier 91, which corresponds to the carrier 21, carries in its interior a work spindle 92 which is independently rotatable for indexing the work. An arm 93 fixed and keyed to one end of the carrier 91 extends outwardly therefrom to support an outboard center 94, by and between which and a center 95 in the spindle an arbor 96 carrying the work piece 19 is supported and alined axially with the spindle. A second arm 97, secured to the opposite end of holder 91 supports a hydraulic motor 98, of known character, the rotor of which is coupled with the spindle for imparting work-indexing rotation thereto when permitted by the index controlling mechanism later described.

Figure 7:
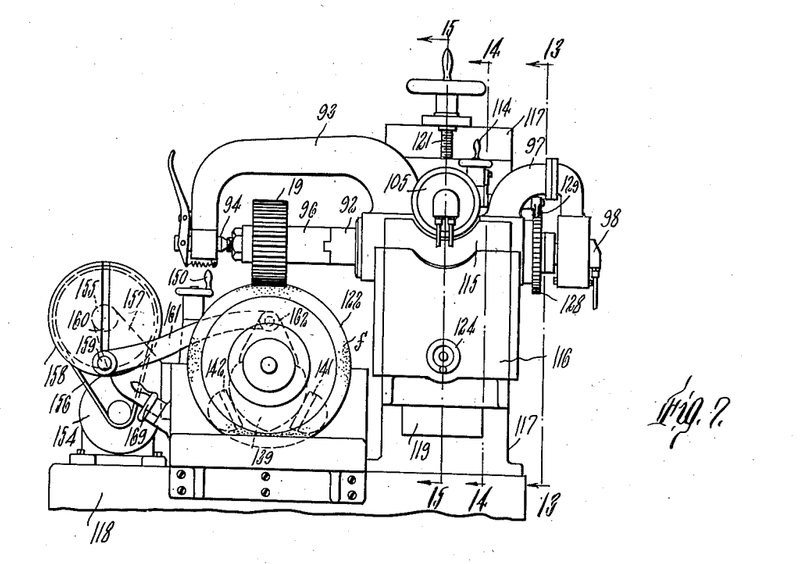
Fig. 7 is a side elevation of another form of machine embodying the same principles and containing added features.
Figure 8:
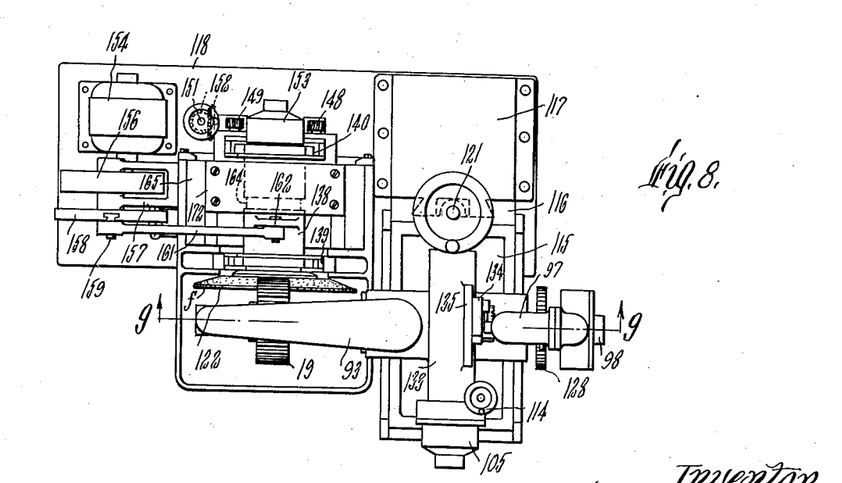
Fig. 8 is a plan view of the machine shown in Fig. 7.

The carrier or work holder 91 carries on its opposite ends formers 99 and 100 which rest on and between abutments 101 carried by angularly adjustable bars 102. These formers and abutments are substantially identical in construction, arrangement and function with the formers and abutments precedently described to cause lateral displacement of the carrier 91, and to maintain the axis of the carrier always in the same plane during such displacement, when the carrier is rotated. The means for rotating the carrier are a worm 103 and a meshing worm gear segment 104, secured coaxially to the carrier, like the worm 43 and gear segment 44. In this instance the worm is driven by a reversible hydraulic motor 105 instead of an electric motor. The means for reversing motor 105 are not shown, it being obvious that valves controlled by the rotating worm, equivalent to the switches 62 and 63, and the switch contactors 68 and 69, may be applied to this combination to cause circulation of working fluid alternately in opposite directions through the motor. A reversal of the guide means for the rolling carrier is here shown, consisting of a fixed grooved bar 106, into the groove of which a rib 107 on the under side of the carrier projects. Means for turning the bars 102 to shift the angle of the abutments 101 comprise worms 108 meshing with gear teeth 109 on the bars and carried by a shaft 110. A bevel gear 111 on shaft 110 meshes with a bevel gear 112 on a shaft 113, which carries a handle 114 accessible for manual rotation, whereby the abutments may be adjusted within limits.

The housing 133 and bearings for worm 103, the support for guide 106, and the bearings for the abutment carrying bars 102 and shafts 110 and 113, are carried by, or form structural parts of, a cradle 115, which has an external convex cylindrical bearing surface and is contained in a complemental bearing in a slide or bracket 116, which is supported by a column 117 rising from the machine base 118. Bracket 116 is slidingly engaged with upright guideways 119 on the column and carries an internally threaded lug 120 through which a screw 121 passes. This screw is supported by column 117, and may be rotated by hand to raise and lower the bracket, whereby to accommodate work pieces and grinding wheels of different diameters.

Figure 16:
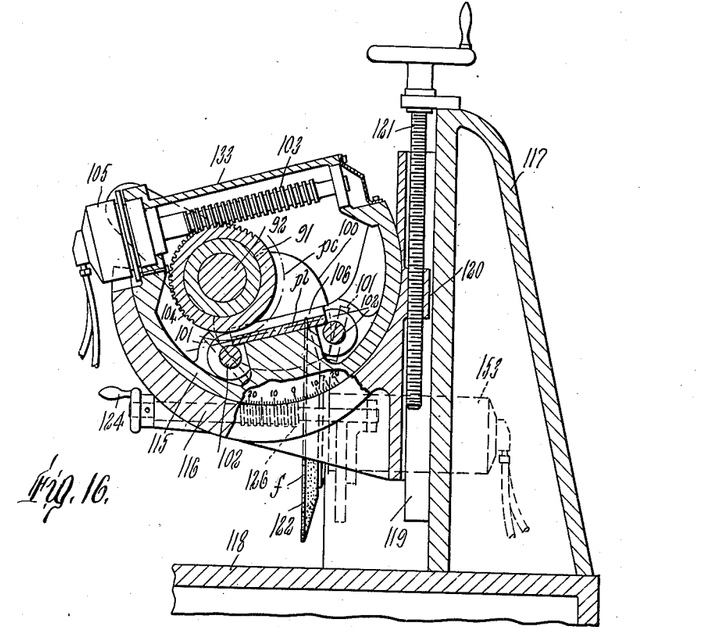
Fig. 16 is a sectional view similar to Fig. 15 showing the adjustable work supporting means of the machine last described in a different position from that represented in Fig. 15.

It will be noted that the grinding wheel 122 here shown has an active face $f$ in a plane perpendicular to the spindle 123 to which it is secured, and that this spindle is arranged with its axis horizontal and incapable of adjustment to any other angle. Any desired angularity of the rolling path of the work piece to the grinding wheel face is obtained by angularly adjusting the cradle 115 in its bearing, accomplished by a hand crank 124 secured to a shaft 125 which is rotatably mounted in the bracket 116 and carries a worm 126 in mesh with teeth 127 on the circumference of the cradle. Adjustments so made accomplish the same effect as the adjustments of the inclination of the grinding wheel previously described. Fig. 16 shows graphically how such an adjustment of the cradle causes the work gear to roll on a pitch line $pl$ intersecting the grinding wheel face $f$ at the correct inclination to the grinding wheel face to generate a desired curved surface.

Rotation of the carrier 91 is transmitted to the spindle by a notched index plate 128 secured to the spindle and a pawl 129 carried by a rock shaft 130, mounted rotatably in the arm 97, which pawl is spring actuated to interlock with the index plate. A trigger arm 131 is secured to rock shaft 130 in a location which causes it to engage and pass a trip 132 as the carrier 91 and connected arm 97 rock back and forth.

Trip 132 is adjustably mounted on the housing 133 which encloses the worm 103, being pivoted to a plate 134 which is adapted to be clamped in different positions along a guideway 135, which is secured to housing 133. The trip is pressed by a spring 136 against a stationary stop on plate 134 with its extremity in the path of the trigger arm 131. When the trigger passes the trip in the counterclockwise (with respect to Figs. 13 and 14) roll of the carrier, it is displaced and withdraws locking pawl 129 from the index plate. The motor 98, which may be of a character to exert constant torque, then turns the spindle and, when the trigger clears the trip, the locking pawl snaps into the next notch of the plate. On its swing in the opposite direction, the trigger displaces the trip without being itself displaced. By means of the adjustable plate 134, the trip may be placed to accord with work rolling movements of different extents to cause indexing after the work has rolled clear of the grinding wheel.

The grinding wheel of this machine is reciprocated endwise of the work, to distribute its action throughout the extent of wide faced gears and the like, by means which do away with the necessity of any slide or carriage for supporting it. The wheel spindle 123 is mounted rotatably in a tubular carrier 138 to which is secured, at its opposite ends, formers 139 and 140 like the formers previously described, each of which enters the space between, and is supported by, a pair of abutments 141 and 142. The corresponding abutments of both pairs are secured to rotatably mounted bars 143 and 144 respectively, whereby they may be adjusted to change their inclinations, equally and oppositely. Worms 145 and 146, of opposite hands, are mounted on a shaft 147 and mesh with gears 148 and 149 on the respective bars. Shaft 147 may be turned to adjust the rotatable bars and abutments in unison by a handle 150 on a shaft 151 coupled to the shaft 147 by bevel gearing 152.

Figures 9, 10, 11, 12:
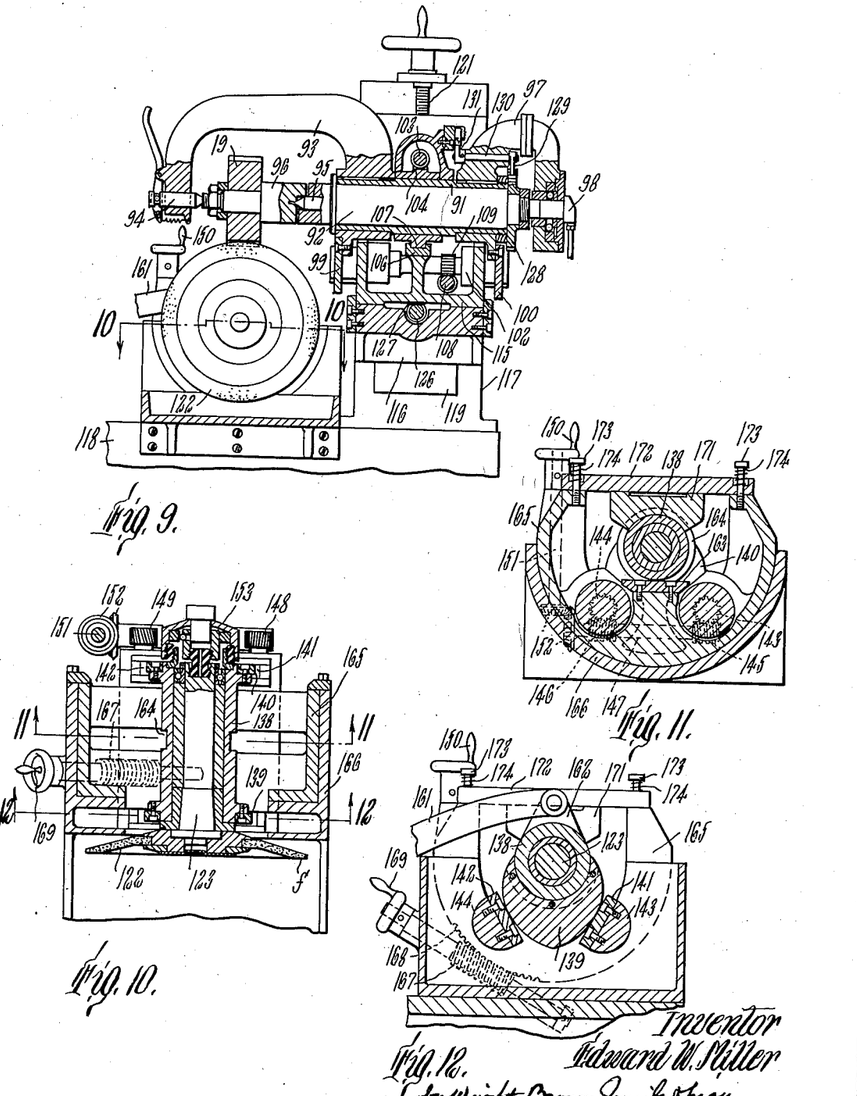
Fig. 9 is a vertical section taken on line 9—9 of Fig. 8.
Fig. 10 is a horizontal section taken on line 10—10 of Fig. 9.
Figs. 11 and 12 are cross sections taken on lines 11—11 and 12—12, respectively, of Fig. 10.
Figure 13:
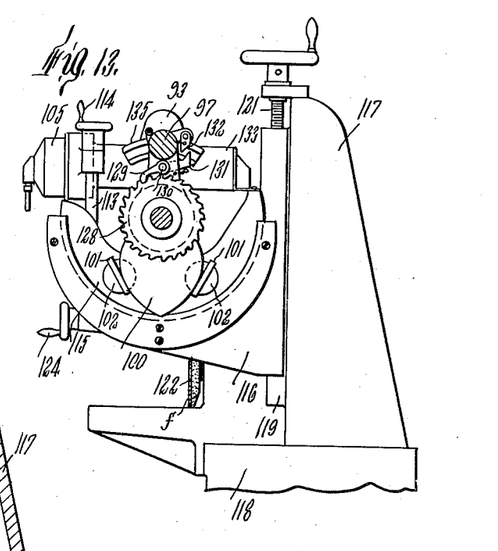
Fig. 13 is a sectional end elevation of the machine projected on the plane designated by the line 13—13 of Fig. 7.
Figure 14:
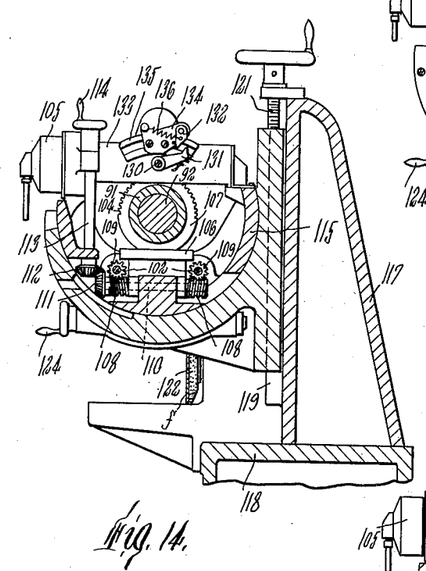
Figs. 14 and 15 are cross sections on the lines 14—14 and 15—15, respectively, of Fig. 7.
Figure 15:
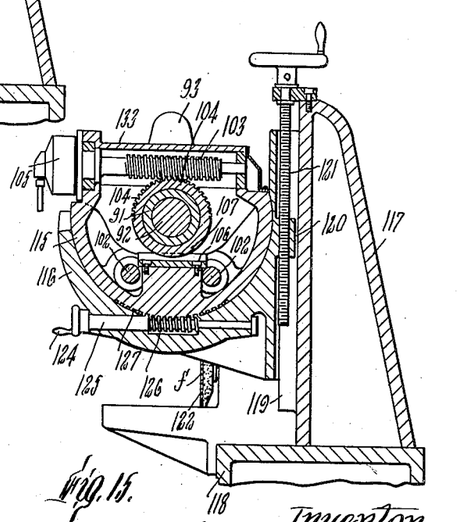

The cooperative combination and functions of the carrier 138, formers 139 and 140 and abutments 141 and 142 are identical with those of the previously described combinations of carrier, formers and abutments, in causing translative displacement of the spindle in a straight path transverse to its axis when rotation is imparted to the carrier. That part of the rim of the grinding wheel which engages the work is likewise displaced in a straight line. The diagram shown in Fig. 20 and previously described demonstrates equally that the center of the grinding wheel will travel in a straight line corresponding to the line $d^2$—$d$—$d'$ when its carrier 138 is rotated. The rotary component of motion of the carrier is of no consequence so far as the rotation of the grinding wheel is concerned, for the latter is continuously rotated in one direction at efficient speed, which is many times more rapid than said rotary component, by a motor 153. This motor, which is shown in section in Fig. 10, is a hydraulic motor of known type and may be like the wheel driving motor 51 shown in Fig. 2 and the worm driving motor 105 shown in Fig. 13. Of course other types of motor may be used in any of these locations.

For so rotating the wheel carrier oscillatively, a motor 154, here represented as an electric motor, is mounted on the machine base and drives the shaft 155 by a belt and pulley drive 156. Shaft 155 is supported by a bracket 157 on a part of the machine structure and carries a crank disk 158 having a crank pin 159 adjustably secured at any desired point along a diametral slot 160 in the face of the disk. A connecting rod 161 couples the crank with an arm 162 on carrier 138 so that, when the crank is constantly rotated in one direction, the arm is swung back and forth. A stationary guide bar 163 occupies tangentially a groove 164 in the carrier 138 to prevent axial displacement thereof and of the grinding wheel.

The abutments and their carrier bars, as also the guide bar 163, are contained in and supported by a cradle 165 having an external cylindrical bearing surface, or surfaces, of which the axis is parallel to the spindle axis, seated rotatably in a stationary bearing 166, which is mounted rigidly on the machine frame. An adjusting screw or worm 167 is mounted rotatably in this bearing structure and meshes with teeth 168 on the circumference of the cradle. It may be rotated by a handle 169 to adjust the cradle so that the grinding wheel may be reciprocated in a horizontal path or in sloping paths of various degrees of inclination. Thus, for instance, the rim of the grinding wheel may be caused to travel in the inclined path indicated by the arrows $s$ in Fig. 17, and thereby to grind tapered gears, such as the work piece 170, gear shaper cutters, and other tapered surfaces.

In order to supplement gravity in maintaining continuous firm contact between the formers and abutments of the grinding wheel carrier, a hold-down shoe or slide 171 is located over the carrier 138 in bearing contact with the upper side thereof, and beneath a guide plate 172 which is supported on opposite sides of the cradle 165 to bridge over the path of lateral reciprocation of the spindle. In order to permit the small amount of up and down displacement of the formers 139, 140 and the rest of the wheel carrier assemblage, due to change in the inclinations of the abutments, the guide plate may be mounted with provision for corresponding displacement. To that end it is here shown as being located on the cradle 165 by a number of headed studs 173, which pass freely through holes in the guide plate into threaded engagement with the cradle, and springs 174 may be confined under stress between the heads of the studs and the upper side of the guide plate. Tendency of the carrier and formers to rise from the abutments, due to inertia of the reciprocating parts of the driving mechanism (connecting rod 161 and crank arm 162), is thus overcome by the spring pressure, which may be moderate enough to avoid any substantial resistance due to the sliding friction of the shoe 171. Similar hold-down shoes may be provided for the rolling work carriers, but in general the weight of these carriers is sufficient, and their rate of reciprocation sufficiently slow, to make hold-down means for them unnecessary.

The same high quality of accuracy and finish is not required in the case of the hold-down shoe and its guide, as is required for the guideways of a sliding work or tool carriage which must reciprocate in an exact path in order to turn out satisfactory work. Hence essentially the same benefit is obtained in the case of the wheel carrier by means of its rolling support of abutments and formers, as is obtained in the case of the work carrier.

A variant of the machine last described is shown in Fig. 18, where a grinding wheel 175, of which the profile, or radial section at the circumference has the form of a rack tooth, is substituted for the plane-faced wheel 122. Such a wheel has two active faces $f$ and $f'$, which are sections of cones taken between planes perpendicular to the axis and the inclinations of which are opposite to each other. This wheel is of the character of that shown diagrammatically in Fig. 20. The spindle and spindle carrier of this wheel are extended forwardly to a greater distance than the corresponding parts of the wheel 122, so as to locate the mid plane of wheel 175 substantially in radial alinement with the mid position of the work holder axis. The wheel spindle holder in this case is equipped with formers 139 and 140 and is supported by abutments in the same manner, and oscillated by the same mechanism, as described in connection with Figs. 7–17, to reciprocate the wheel in exactly the same manner as there described. For the rest, the machine of Fig. 18 is like the machine of Fig. 7, except that it has no cradle corresponding to cradle 115, and the supporting and operating means for the work carriage are mounted directly on the bracket or slide 176, which corresponds to the bracket 116 of the precedently described machine.

Figure 17:
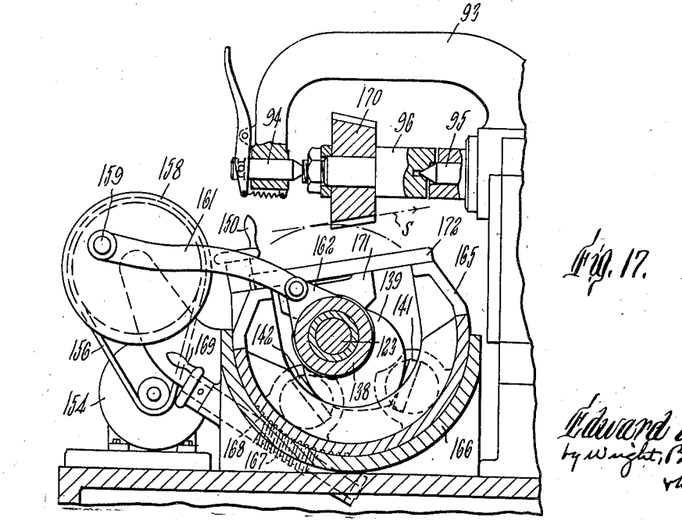
Fig. 17 is a view similar to Fig. 12 showing the adjustable tool supporting means in a different position of adjustment from that represented in Fig. 12.
Figure 19:
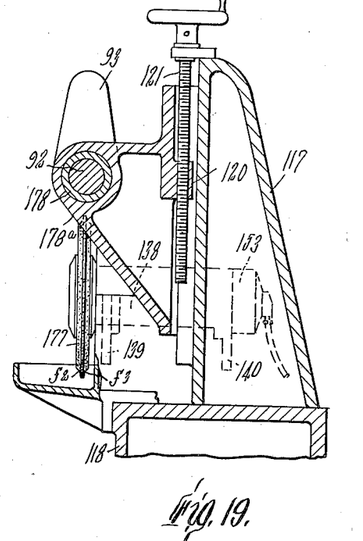
Fig. 19 is a similar view of another embodiment of the invention in which a formed grinding wheel is used having a profile complemental to the shape to be cut in the work piece.
Figure 23:
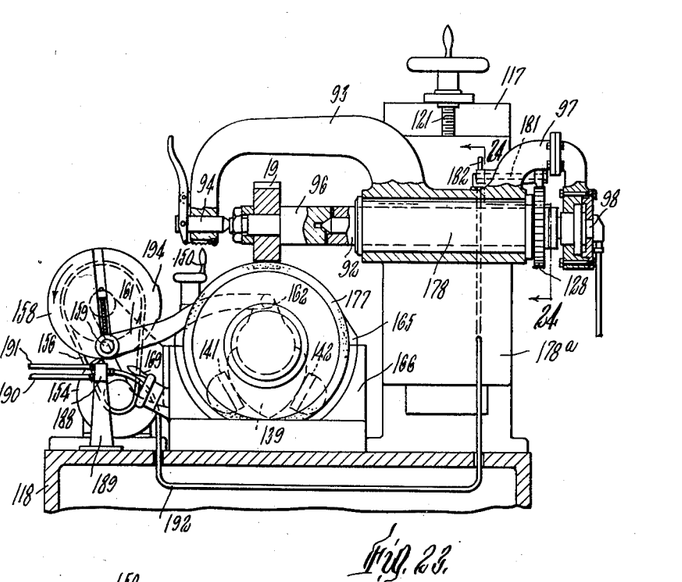
Fig. 23 is a section similar to Fig. 9 of the machine variation shown in Fig. 19.
Figure 24:
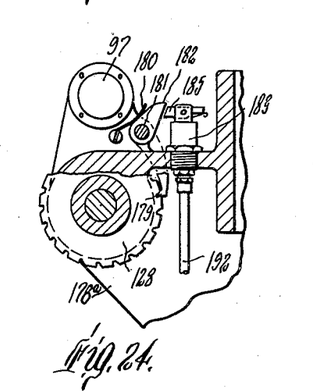
Fig. 24 is a detail section taken on line 24—24 of Fig. 23.
Figure 25:
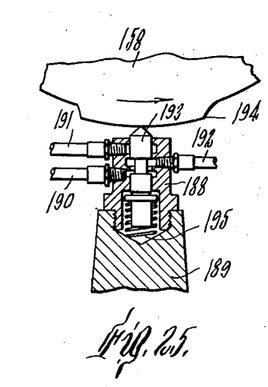
Fig. 25 and Fig. 26 are sectional details of the means for indexing the work in the last mentioned machine.
Figure 26:
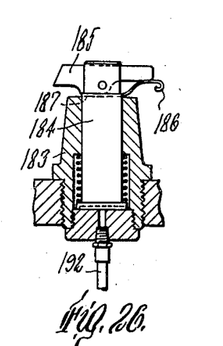

Figs. 19 and 23 show the application of the wheel-reciprocating means, previously described, to a formed grinding wheel 177, of which the faces $f^2$ and $f^3$ have profiles complemental to the side faces bounding a tooth space in a gear, or may be complemental to other shapes to be produced in a work piece. Here the wheel 177 is located in the same position relative to other parts of the machine as in Fig. 18, and its spindle is contained in a rolling carrier 138 which is rocked and displaced in a straight path by means the same as those shown in Figs. 7, 8, 10, 11 and 12; and the inclination of its path may be changed by adjustment of a cradle, as shown in Fig. 17. Hence the preceding description of means for supporting, rolling and adjusting the tool holder apply here and the constituent parts are identified by the same reference characters used in that description.

Inasmuch as the contours required in the work are produced by the form of this grinding wheel 177, the work is held stationary while the wheel acts upon it, and is rotated only for indexing purposes at times when the wheel is clear of it. Hence the work spindle 92 is contained in a stationary bearing sleeve 178 supported by a bracket 178a which is slidable and adjustable on a column 117 in the same manner and by like means as the brackets 116 and 176.

For indexing the work, a hydraulic motor 98 and a notched index plate 128 are connected with the spindle 178. A pawl 179 is arranged to interlock with the notches of the index plate, being actuated thereto by a spring 180, and is carried by a rock shaft 181, journaled in arm 97, to which also a trigger arm 182 is secured. Spring 180 bears on arm 182.

There is mounted on the bracket 178a near the trigger 182 a cylinder 183, in which a piston 184 is reciprocably mounted. The piston carries a trip 185 and a spring 186 bearing on the trip to hold one side of it against a rigid stop shoulder 187. It is able to yield away from the shoulder.

These parts are so arranged that when the piston is raised by accession of fluid to the lower end of cylinder 183, the trip is carried past the end of trigger 182, wiping along the adjacent side of the latter and displacing it sufficiently to release pawl 179 from the index plate; and continuing until it clears the trigger. Motor 98 acts to rotate the spindle before the locking pawl can return to the same notch, and brings the next notch of the disk up to the pawl after the latter has been released by the trip and brought to bear again by spring 180 on the circumference of the index plate. On return of the piston, the trip yields in passing the trigger.

A control valve 188 is mounted on a support 189 near the crank disk 158. It contains inlet and outlet ports connected with supply and return pipes 190, 191, respectively, and a delivery port connected by a pipe 192 with the cylinder 183. A valve body 193 is contained in the valve 188 with one end protruding for engagement by a cam projection 194 carried by a crank disk 158. A spring 195 tends to move the valve body 193 outward and normally holds it in the position where the pipes 191 and 192 are in communication and the port into which supply pipe 190 opens is shut off. The action of cam 194 on the valve body reverses this situation and connects the supply line with the delivery line, whereby trip 185 is operated to release the index locking pawl. Thus indexing of the work is timed by the mechanism for reciprocating the grinding wheel, and cam 194 is located to cause indexing when the wheel is at one end of its travel and sufficiently displaced from the work to permit rotation of the latter.

The new feature of a holder caused to travel in a straight path by the rolling coaction of formers and abutments, and with elimination of a sliding carriage and guideways, is common to all embodiments of the invention here illustrated. In the machine of Figs. 1-6, it is applied to the work carrier only; in the machines of Figs. 7-18 inclusive, it is applied to both the work carrier and the tool carrier; and in the machine of Figs. 19 and 23-26 it is applied to the tool carrier only. This principle is applicable to machines of other designs adapted to perform various other operations, wherefore I claim protection for it generically in all forms and combinations wherein it may be embodied and for all uses to which it may be applied.

It will be evident to those skilled in the art, without specific illustration, that rolling means for reciprocating the tool may be applied also in the design of machine shown in Fig. 1, in substitution for the sliding carriage 11. It will be equally apparent that the automatic indexing means shown in Figs. 9, 13 and 14 may be substituted for the manual indexing means of Figs. 1 and 5, with no substantial changes other than possibly of dimensions and proportions of some of the parts; and that so may the indexing means of Figs. 23-26, together with suitable provisions for controlling the valve, like or equivalent to the controller there shown.

What I claim and desire to secure by Letters Patent is:

1. In a machine, a carrier and means for supporting and effecting displacement of said carrier in a given path, comprising a former in rigid connection with the carrier and extending downwardly therefrom having opposite convex bounding faces, both of which are curves generated from the same base circle, abutments tangent to the respective opposite faces of the former, said tangent faces of the respective abutments being in mutually intersecting downwardly convergent planes, and means for oscillating the carrier about the center of said base circle.

2. In a machine, a carrier and means for supporting and effecting displacement of said carrier in a given path, comprising a former in rigid connection with the carrier and extending downwardly therefrom having opposite convex bounding faces, both of which are curves generated from the same base circle, two abutments each tangent to one of the opposite faces of the former at a point below the center of said base circle, said tangent faces of the respective abutments being in mutually intersecting downwardly convergent planes, and means for applying force to the carrier in a direction tangential to the center of said base circle.

3. The combination of a carrier, means for applying force to said carrier tending to rotate it about a center, and means for supporting the carrier and transforming the force application into linear displacement of the carrier, consisting of a former protruding from the under side of the carrier, having opposite convex faces, and abutments in tangent engagement, each with one of said faces, and being inclined convergently toward an intersection beneath the former.

4. The combination of a carrier, means for applying force to said carrier tending to rotate it about a center, and means for supporting the carrier and transforming the force application into linear displacement of the carrier, consisting of a former protruding from the under side of the carrier, having opposite convex faces which are involute curves of a base circle coaxial with said center, and abutments having plane faces each tangent to one of the said faces of the former, said abutment faces being inclined convergently toward an intersection beneath the former.

5. A machine combination comprising abutments spaced apart from one another and having engaging faces inclined convergently each toward the other, a former having opposite convex faces located between said abutments with each of said faces in tangent contact with one of the abutments, said faces of the former being curves generated from a base circle, a carrier in rigid connection with the former, means for mounting a work piece or a tool on said carrier, and means for applying torque to the carrier tending to rotate it about the center of said base circle, whereby the coaction of former and abutments causes displacement of said center in a linear path.

6. A machine for generating curves in a work piece, comprising a work carrier, means for mounting a work piece on said carrier in a prescribed axial relation with the carrier, a former in rigid connection with the carrier having opposite curved faces, two abutments of respectively opposite inclinations arranged in tangent contact, each with one of said former surfaces so as to impart angular movement to the carrier when the carrier is displaced in a direction transverse to the abutments and located to support the former and carrier, means for supporting said abutments, means for so displacing the carrier, and an operating tool located in position to act on the work piece mounted on the carrier.

7. A slideless work holder comprising a carrier, a former in rigid connection with said carrier having opposite faces which are curves generated from a base circle concentric with the carrier and located at the under side of the carrier, abutments inclined in downwardly convergent relation to one another located in tangent supporting contact with the respective former faces, means for securing a work piece to the carrier in coaxial relation with said base circle, and means for exerting force on the carrier transversely of said axis whereby, through coaction of the former and abutments, the carrier and work are rolled with a compound movement of translation in a plane and rotation about said axis.

8. In a machine of the character described, a carrier having gear teeth arranged circumferentially around the upper side thereof, a former in rigid connection with the under side of the carrier extending downwardly therefrom and having opposite curved faces of which the curvature is generated with respect to a base circle concentric with the axis of the carrier and the said series of teeth, abutments in tangent engagement with the opposite faces of the former below the widest part thereof inclined toward one another in the downward direction, constituting supporting means for the former and carrier, and a worm rotatably supported in driving mesh with said teeth; the former and abutments being disposed to cause translation of the carrier in a straight path and the engaging side of said worm being parallel to said path.

9. In a machine as set forth in claim 6, the combination of means for changing the inclinations of the abutments, whereby to vary the ratio of the translative and rotative components of movement of the carrier.

10. A machine as set forth in claim 6, in which the supporting means for the abutments comprise a cradle, and a support for said cradle in which the latter has a rotative bearing about an axis extending in the same direction as the axis of the carrier.

11. In a machine, a support having a circular bearing, a cradle mounted on said support adjustably about the axis of said bearing, abutments mounted in said cradle spaced apart from one another and inclined convergently downward, a carrier located in the cradle, a former in rigid connection with the carrier at the under side thereof extending between the abutments and having opposite side faces in tangent contact with the abutments and being wholly supported thereby, the said faces of the former being curves of a base circle, of which the axis extends in the same direction as the axis of the cradle, and a driving element mounted on the cradle in rotation transmitting engagement with the carrier.

12. In a machine, a support having a circular bearing, a cradle mounted on said support adjustably about the axis of said bearing, abutments mounted in said cradle spaced apart from one another and inclined convergently downward, a carrier located in the cradle, a former in rigid connection with the carrier at the under side thereof extending between the abutments and having opposite side faces in tangent contact with the abutments and being wholly supported thereby, the said faces of the former being curves of a base circle, of which the axis, in one of the positions of the carrier, is coaxial with the bearing surface of the cradle, said carrier having a series of teeth extending across its upper side in a line concentric with said axis, and a worm mounted on the cradle extending over the carrier in a line parallel to the path of displacement of the carrier axis, in driving mesh with said teeth.

13. A machine tool comprising a spindle carrier, a work spindle mounted rotatably in said carrier, a lock coupling the spindle to the carrier for transmitting rotation to the spindle when the carrier is rotated, a former in rigid connection with the carrier extending downwardly therefrom having opposite curved faces of which the curves are generated from a base circle coaxial with the carrier and spindle and intersect at a point beneath the center of said circle, inclined abutments underlying the former in tangent supporting contact therewith, a tool beneath the spindle axis in position to act upon the under portion of a work piece secured to the spindle, and means for exerting torque on the carrier, whereby it is caused to roll in non slip relation to a pitch plane established by the lines of action between the former and the abutments, and a work piece carried by the spindle is caused to roll across the tool.

14. A machine tool as set forth in claim 13, combined with means for uncoupling the work spindle from the carrier, and means for rotating the spindle relatively to the carrier.

15. A machine tool comprising a spindle carrier, a work spindle mounted rotatably in said carrier, a motor secured to the carrier and including torque exerting means coupled with the spindle, a coupling between the carrier and spindle for transmitting rotation from the carrier to the spindle and including a releasable latch mounted on the carrier, a former in rigid connection with the carrier extending downwardly therefrom and having oppositely curved faces, inclined abutments underlying the former in tangent contact with said faces and constituting the support for the foregoing assemblage, said abutments being disposed to cause lateral displacement of the carrier and spindle, by reaction with said former, when the carrier is rotated about its axis, a tool located below a portion of the spindle in position to act on the under portion of a work piece secured to the spindle, means for rotating the carrier about its axis alternately in opposite directions, and a stationary trip located to act upon said latch in a manner to cause its release in the course of the lateral movement of the carrier.

16. A machine tool comprising a work spindle carrier, a spindle mounted rotatably in said carrier for indexing, a tool carrier, one of said carriers being mounted for rolling translative movement relatively to the other, a former projecting from the under side of said rolling carrier having opposite curved contact surfaces, a pair of oppositely inclined abutments underlying the former and supporting the same in tangent contact with said surfaces, means for applying torque to said carrier whereby it is shifted bodily in consequence of rolling reaction between said former and abutments, clutching means between the spindle carrier and spindle to prevent rotation of the spindle independently of the carrier, including a releasable latch, a motor in reactive connection with the carrier and spindle for applying indexing torque to the spindle, and means for releasing said latch at a prescribed point in the rolling movement of said rolling carrier.

17. A machine tool comprising a work spindle carrier, a spindle mounted rotatably in said carrier for indexing, a tool carrier, one of said carriers being mounted for rolling translative movement relatively to the other, a former projecting from the under side of said rolling carrier having opposite curved contact surfaces, a pair of oppositely inclined abutments underlying the former and supporting the same in tangent contact with said surfaces, means for applying torque to said rolling carrier whereby it is shifted bodily in consequence of rolling reaction between said former and abutments, clutching means between the spindle carrier and spindle to prevent rotation of the spindle independently of the carrier, including a releasable latch, a motor in reactive connection with the carrier and spindle for applying indexing torque to the spindle, and latch releasing means controlled by the rolling movement of said rolling carrier for releasing said latch to permit indexing actuation of the spindle by the motor.

18. A machine tool comprising a work spindle carrier, a spindle mounted rotatably in said carrier for indexing, a tool carrier, one of said carriers being mounted for rolling translative movement relatively to the other, a former projecting from the under side of said rolling carrier having opposite curved contact surfaces, a pair of oppositely inclined abutments underlying the former and supporting the same in tangent contact with said surfaces, means for applying torque to said carrier whereby it is shifted bodily in consequence of rolling reaction between said former and abutments, clutching means between the spindle carrier and spindle to prevent rotation of the spindle independently of the carrier, including a releasable latch, a motor in reactive connection with the carrier and spindle for applying indexing torque to the spindle, a trip for releasing said latch to permit indexing rotation of the spindle, and means operated by the torque applying mechanism of the rolling carrier for actuating said trip.

19. A machine tool comprising a work carrier, a tool carrier, cooperative formers and abutments for the respective carriers, of which the formers are arranged beneath the respective carriers and the abutments are mounted on the frame structure of the machine beneath and in supporting contact engagement with the respective formers; the cooperating formers and abutments being shaped and arranged to cause translative displacement of their respective carriers when torque is applied to the carriers tending to rotate them; and a tool carried by said tool carrier in position to act progressively on a work piece carried by said work carrier.

20. In a machine tool, a work carrier, means for effecting simultaneous angular movement and translative displacement of said carrier in a given path, comprising a former in rigid connection with the carrier having opposite convex bounding faces, abutments tangent to the respective opposite faces of the former beneath and in supporting contact with the former, and means for oscillating the carrier; combined with a tool carrier, a former in rigid connection therewith having opposite curved bounding faces, abutments underlying said former in tangent supporting contact with the faces thereof, means for oscillating said tool carrier about an axis, and a tool carried by the tool carrier in position to act on a work piece secured to the work carrier.

21. A machine tool for generating wide surfaces of involute curvature, comprising a work carrier, means for displacing bodily and rotating said work carrier so that the portion of a work piece carried thereby on which an involute curve is to be generated rolls in nonslip pitch circle relation to a pitch plane, said means comprising a former having opposite curved faces, the curves of which are involutes of a base circle coaxial with the prescribed axis of rotation of the work carrier, inclined abutments supporting said former in tangent contact with the opposite faces thereof, and means for imparting rotation to the work carrier about said axis; a tool carrier, a tool mounted on said tool carrier having a cutting portion formed to generate such a curve in a work piece when located to cross the before named pitch plane and the work piece is rolled across and in contact with said cutting portion, a former rigidly connected with the under side of the tool carrier having opposite faces which are curves of a base circle, abutments underlying said former in tangent supporting contact with the side faces thereof, and means for exerting force on the tool carrier tangentially of the axis thereof so as to effect translative displacement of the carrier by interaction of the former and abutments, the tool carrier and its former and supporting abutments being so located that the displacement of the tool carrier and tool takes place in a direction substantially parallel to the axis of the work carrier.

22. A machine tool as set forth in claim 21, combined with a supporting cradle in which the abutments for the tool carrier are mounted, and a support for the cradle constructed to permit angular adjustment thereof so as to locate the path of the tool at various angles to the axis of the work carrier.

23. A gear grinding machine comprising a work spindle carrier, a work spindle rotatably mounted in said carrier for indexing, means for rotating said carrier, supporting abutments underlying the carrier and formers rigidly connected to the carrier projecting downward therefrom into tangent contact with the abutments, said former and abutments having contact surfaces cooperatively formed and arranged to cause lateral displacement of the carrier and work spindle when the carrier is rotated, a grinding wheel carrier, a grinding wheel spindle rotatably mounted in the last named carrier, supporting abutments underlying the grinding wheel carrier, a former secured to the grinding wheel carrier extending downward into supported tangent contact with the last named abutments, the grinding wheel carrier being located beneath the displacement path of a work piece secured to said work spindle and the abutments and former associated with the grinding wheel carrier being disposed to cause displacement of that carrier lengthwise of the work spindle axis when the carrier is rotated about the axis of the grinding wheel spindle, a grinding wheel secured to said spindle in position to engage at its upper edge with the under portion of a gear secured to the work spindle, means for oscillating the grinding wheel carrier, and means for independently rotating the grinding wheel spindle.

24. A machine tool for generating wide curved surfaces, comprising a tool carrier, means for moving said tool carrier back and forth in a given path, a work carrier, a former secured to said work carrier extending downwardly and having opposite curved faces, inclined abutments underlying said faces in tangent supporting contact therewith, said abutments being located to support the work carrier over the path of the tool carrier with provision for rotation of the work carrier about an axis extending in the same general direction as said path, and with provision for displacement transversely of said axis, means for rotating the work carrier about said axis and causing lateral displacement thereof by coaction of the former and abutments, a rotatable cutting tool supported on said tool carrier with its plane of rotation substantially parallel to the work carrier axis, and means for rotating said tool.

25. A machine tool for generating wide curved surfaces, comprising a tool carrier, means for moving said tool carrier back and forth in a given path, a work carrier, a former secured to said work carrier extending downwardly and having opposite curved faces, inclined abutments underlying said faces in tangent supporting contact therewith, said abutments being located to support the work carrier over the path of the tool carrier with provision for rotation of the work carrier about an axis extending in the same general direction as said path, and with provision for displacement transversely of said axis, means for rotating the work carrier about said axis and causing lateral displacement thereof by coaction of the former and abutments, a rotatable cutting tool supported on said tool carrier with its plane of rotation substantially parallel to the work carrier axis, and means for rotating said tool, said tool being adjustable to place its plane of rotation at various inclinations.

26. A machine tool for generating wide curved surfaces, comprising a tool carrier, means for moving said tool carrier back and forth in a given path, a work carrier, a former secured to said work carrier extending downwardly and having opposite curved faces, inclined abutments underlying said faces in tangent supporting contact therewith, said abutments being located to support the work carrier over the path of the tool carrier with provision for rotation of the work carrier about an axis extending in the same general direction as said path, and with provision for displacement transversely of said axis, means for rotating the work carrier about said axis and causing lateral displacement thereof by coaction of the former and abutments, a rotatable cutting tool supported on said tool carrier with its plane of rotation substantially parallel to the work carrier axis, and means for rotating said tool, said abutments being adjustable to different inclinations so as to vary the extent of lateral displacement of the work carrier with a given angle of rotation thereof.

27. In a machine tool, a rotatable cutting tool, a spindle to which said tool is secured, a carrier in which said spindle is rotatably mounted, a former secured to said carrier and extending downward therefrom having opposite curved faces based on a base circle coaxial with said spindle, abutments having oppositely inclined faces in supporting tangent contact with the faces of the former, means for oscillating the carrier whereby to move it translatively through coaction of the former and abutments, and means for rotating the spindle independently of the carrier.

28. In a machine tool, a support, a cradle mounted on said support with capacity for angular adjustment about an axis, a pair of oppositely inclined abutments mounted on said cradle, a former having opposite curved faces in tangent rolling contact with said abutments and being supported thereby, a carrier secured to and supported by said former in position to be rotated about an axis and displaced transversely of said axis when the former is rocked on the abutments, said axis being substantially parallel to the axis of angular adjustment of the cradle, and means for imparting motion to the carrier and former assemblage whereby to rock the same on the abutments.

29. In a machine, a rotatable carrier and means for supporting said carrier with provisions for displacement in a given path, comprising a former beneath and in rigid connection with the carrier having faces which are curves of relatively opposite curvatures generated from a base circle, the center of which is coaxial with the axis of rotation of the carrier, and abutments having contact faces inclined to one another located below said axis in tangent supporting contact with the faces of the former.

EDWARD W. MILLER.